United States Patent
Hoffman et al.

(12)

(10) Patent No.: US 6,281,888 B1
(45) Date of Patent: Aug. 28, 2001

(54) PEN INPUT DEVICE USING ELECTROSTATIC COUPLING

(75) Inventors: Frank Hoffman, Hamburg (DE); Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/226,788

(22) Filed: Jan. 7, 1999

(51) Int. Cl.[7] ............................ G09K 11/16; G09G 5/00
(52) U.S. Cl. .................... 345/179; 345/173; 345/179; 178/18.01; 178/18.06
(58) Field of Search .................................. 345/173, 174, 345/179; 178/18.01, 18.06

(56) References Cited

U.S. PATENT DOCUMENTS

| | | | | |
|---|---|---|---|---|
| 4,281,323 | * | 7/1981 | Burnett et al. ................ | 345/174 |
| 4,293,734 | * | 10/1981 | Pepper, Jr. .................... | 178/18.01 |
| 4,550,221 | * | 10/1985 | Mabusth ....................... | 178/18.06 |
| 5,343,537 | * | 8/1994 | Bellagarda et al. ........... | 382/186 |
| 5,606,346 | * | 2/1997 | Kai et al. ...................... | 345/173 |
| 5,652,412 | * | 7/1997 | Lazzouni et al. ............. | 178/18.01 |
| 5,747,748 | * | 5/1998 | Zigler ............................ | 178/18 |
| 5,764,218 | * | 6/1998 | Della Bona et al. ......... | 345/145 |
| 5,912,662 | * | 6/1999 | Bunn et al. ................... | 345/179 |
| 5,914,701 | * | 6/1999 | Gersheneld et al. .......... | 345/156 |
| 6,124,848 | * | 9/2000 | Ballare et al. ................ | 345/179 |
| 6,211,799 | * | 4/2001 | Post et al. ..................... | 341/33 |

* cited by examiner

*Primary Examiner*—Steven Saras
*Assistant Examiner*—William C. Spencer
(74) *Attorney, Agent, or Firm*—John L. Rogitz

(57) ABSTRACT

A pen input device includes an array of receiver electrodes and a transmitter juxtaposed with the array for coupling electric signals from the transmitter to a person's hand. A person can use an ordinary writing instrument to write on a paper or other substrate that rests on the array, and the signal from the transmitter is coupled through the person's hand and writing instrument back to the array. The received signal strength is sent to a microprocessor for determining the position of the tip of the writing instrument, and the position can then be sent to a handwriting recognition algorithm to correlate pen strokes across the substrate to alpha-numeric characters. The transmitter can be separate from the receiver electrode array, or the receiver electrodes can be multiplexed such that one of the electrodes is selected to function as the transmitter.

21 Claims, 3 Drawing Sheets

PEN INPUT DEVICE USING ELECTROSTATIC COUPLING

BACKGROUND OF THE INVENTION

1. Field of the Invention

The present invention relates generally to handwriting data entry, and more particularly to methods and systems for facilitating data entry using a pen input device.

2. Description of the Related Art

Pen input devices have been provided in which the movement of a stylus across a detector is sensed by the detector and converted into alpha-numeric characters by handwriting recognition algorithms. Signals representing the alpha-numeric characters are then electronically stored in a computer document or database. In previous devices, the stylus contains either an active transmitter with associated battery, or a passive transmitter that includes a coil which is inductively coupled to remote transmitting circuitry. U.S. Pat. No. 5,608,390 is representative of the former genre of pen input devices, and U.S. Pat. No. 5,619,431 is representative of the latter genre of pen input devices.

It will be appreciated that in either type of existing pen input device, a special purpose stylus is required. This not only increases the cost of the devices, but the special purpose stylli are large and/or heavy compared to ordinary writing instruments. Consequently, the special purpose stylli typically are cumbersome. Further, special purpose stylli are not commonly available, making rapid replacement difficult.

A system incorporating electrostatic coupling of signals through a human body as a medium for short range communication, referred to as Personal Area Network (PAN), is discussed in U.S. Pat. No. 5,796,827, owned by the same assignee as the present invention and incorporated herein by reference. As disclosed in the above-mentioned patent, using the principles of PAN a small, lightweight transmitter automatically communicates information to a PAN receiver via an electrostatic field with which the person conducts. Owing to the principles underlying PAN communications, the PAN receivers are small, low power, low latency, low cost receivers that can be easily disposed on a variety of devices. The receivers sense signals that are sent by the transmitter and that are coupled to the person's body.

We have recognized that the principles of PAN electrostatic communication can be used to provide a pen input device that overcomes the above-noted drawbacks of existing pen input systems by permitting the use of an ordinary, off-the-shelf writing instrument. Thus, the present invention recognizes that it is possible to overcome the above-noted problems efficiently and effectively.

SUMMARY OF THE INVENTION

A pen input device is disclosed for sensing the position of a tip of a writing instrument regardless of whether the writing instrument includes electrical components. In other words, the writing instrument can be a conventional writing instrument containing no electrical components, but only ink, pencil graphite, a conductive body, or other conductive element. The device of the present invention includes an array of receiver electrodes, each of which generates a received signal characterized by a signal strength. Also, a transmitter is associated with the array for coupling transmitted electric signals into a person's hand. Specifically, a person can use the writing instrument to write on a substrate positioned on the array, and the transmitter is arranged such that the transmitted signals are coupled to the person's hand when the person writes on the substrate. A processor is connected to the receiver array to receive at least some of the received signals and to determine a position of the tip based at least in part on the signal strengths.

In a preferred embodiment, the transmitter is positioned adjacent the receiver array. In an alternate embodiment, at least one of the receiver electrodes is controlled by the processor through a multiplexer to establish the transmitter.

As disclosed in detail below, contact logic means are associated with the processor for determining when the tip contacts the substrate. Moreover, position logic means determine a position of the tip by determining a ratio of the sum of plural signal strengths multiplied by one or more corresponding electrode coordinates to the sum of plural signal strengths. A handwriting recognition engine is also disclosed that receives the positions from the processor for correlating the positions to alpha-numeric characters.

In another aspect, in a pen input device including an array of electrodes and one or more electrostatic transmitters juxtaposed with the electrodes, a logic device is disclosed which includes position logic means for determining a position of an ordinary writing instrument relative to the array based on signals from the array. Thus, the invention can include a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein.

In still another aspect, a device for outputting a signal representative of the position of a general purpose writing instrument on a paper substrate includes a base positionable under the paper substrate and plural receivers on the base. At least one transmitter is also supported on the base. In accordance with the present invention, the transmitter is arranged on the base such that signals from the transmitter are coupled into a hand of a person when the paper substrate is supported on the base and the person manipulates the general purpose writing instrument to write on the paper substrate. The signals propagate through the general purpose writing instrument for detection of the signals by the receivers when the person manipulates the general purpose writing instrument to write on the paper substrate.

In another aspect, a method is disclosed for generating position signals representative of positions of a writing instrument on a substrate for use of the position signals by a handwriting recognition engine. The method includes providing a writing instrument that contains no electrical components, but that does inherently contain a conductive element, such as a conductive body, conductive ink or pencil graphite. Most inks contained in commonly available pens are naturally conductive due to the presence on ions in the ink solution. Signals are coupled into a hand of a person manipulating the writing instrument against the substrate, and the signals propagate through the hand and writing instrument. Then, signals are received from the writing instrument and based thereon, the position signals are output to the handwriting recognition engine.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
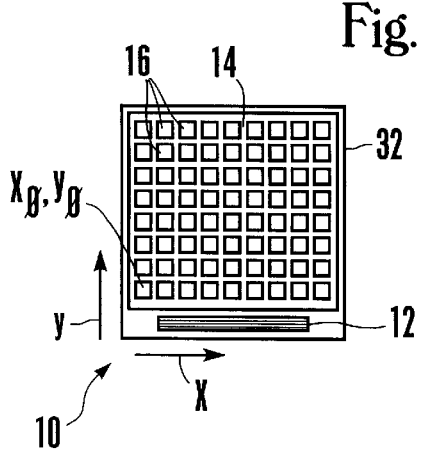
FIG. 1 is a schematic top plan view of the pen input device of the present invention.
Figure 2:
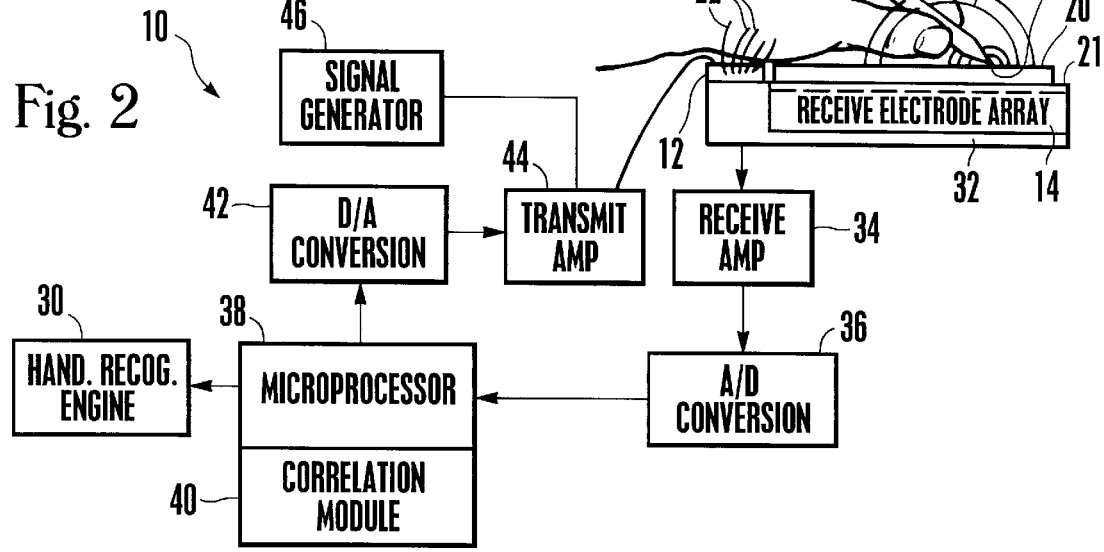
FIG. 2 is a schematic side elevational view of the device shown in FIG. 1, showing a person's hand writing on a paper substrate and schematically showing electrical components of the present invention.

Referring initially to FIGS. 1 and 2, a pen input device is shown, generally designated 10, which includes at least one lightweight, transmitter 12 that can be associated with an array 14 of receiver electrodes 16 for correlating strokes of a general purpose writing instrument 18 against a substrate such as a pad of paper 20 to position signals. The transmitter 12 and receiver electrodes 16 can be the devices described in U.S. Pat. No. 5,796,827. By "general purpose writing instrument" is meant any conventional pen or pencil that ordinarily contains no electrical or electronic components such as pick-up coils or batteries, but that contains conductive material such as a metallic body, pencil graphite or pen ink. If desired, a force sensing layer 21 can be disposed between the substrate 20 and array 14, for purposes to be shortly disclosed. The force sensing layer 21 can include, e.g., force sensing resistors or other force sensors.

In accordance with the present invention, the receiver electrodes 16 can be copper squares etched on a circuit board to establish the array 14, or the electrodes 16 can be junctions of orthogonal elongated conductors. In any case, the electrodes 16 establish a two dimensional array 14 which, as shown best in FIG. 1, defines Cartesian axes "x" and "y". Each electrode$_i$ 16 accordingly has respective electrode coordinates $x_i$, $y_i$. In one preferred embodiment, the origin $x_0$, $y_0$ of the Cartesian coordinate system is at the lower left corner of the array 14 as shown, although the origin alternatively can be arbitrarily defined to be anywhere on the array 14.

The above-referenced U.S. Pat. No. 5,796,827 sets forth details about PAN communication systems; accordingly, for clarity and brevity of disclosure these details will not be repeated herein. By way of brief explanation, however, the transmitter transmits electric signals in an electrostatic field, represented by field lines 22, which are coupled to a hand of a person 24 who interacts with the field lines 22 by, e.g., resting his or her hand or wrist on the transmitter 12, as shown in FIG. 2, or otherwise in close proximity to the transmitter 12. The transmitter 12 can be constructed of conductive plastic, for example. In turn, the signals are coupled through the person 24 to the writing instrument 18, with the writing instrument 18 emitting in response a signal represented by electrostatic field lines 26. As recognized by the present invention and as shown in FIG. 2, although the field lines 26 are emitted along the length of the writing instrument 18, with a concentration of field lines 26 emanating from the writing tip 28 of the writing instrument 18. In accordance with PAN principles, the signals from the writing instrument 18 are sensed by the receiver electrodes 16. In response, the electrodes 16 output signals that are representative of the position of the tip 28 relative to the coordinate system defined by the array 14.

As disclosed in further detail below, output signals from the device 10, which indicate the position of the tip 28, are sent to a handwriting recognition engine 30 for correlation of the position signals to alpha-numeric characters. The handwriting recognition engine 30 can be any suitable handwriting recognition system, such as those disclosed in U.S. Pat. Nos. 5,644,652, 5,343,537, or 5,550,931, all owned by the present assignee and all incorporated herein by reference.

In the embodiment shown in FIGS. 1 and 2, the array 14 of electrodes 16 is supported on a preferably plastic base 32. Likewise, the transmitter 12 is supported on the base 32, alongside the array 14. The base 32 can also hold the below-disclosed electrical components that are appropriate for processing the signals from the receiver electrodes 16.

In one preferred embodiment, the electrical components include a receiver amplifier 34 that is electrically connected to the array 14 to receive signals from the receiver electrodes 16. The amplified signals are sent to an analog to digital conversion (ADC) device 36 for digitization, and the digitized output of the ADC device 36 is sent to a digital processing apparatus, such as a microprocessor 38. In accordance with the present invention, the microprocessor 38 accesses a software or firmware correlation module 40 to correlate the signals from the ADC device 36 to position signals representative of the position of the writing instrument 18 relative to the array 14. These signals are then sent to the handwriting recognition engine 30 for correlation of the position signals to alpha-numeric characters.

FIG. 2 further shows that a digital to analog conversion (DAC) device 42 receives digitized signals from the microprocessor 38 and converts the signal to analog format. The output of the DAC device 42 is sent to a transmit amplifier 44 to vary the gain of a signal genertaor, such as an oscillator 46. In turn, the oscillator 46 is electrically connected to the transmitter 12 to energize the transmitter 12 in accordance with PAN principles. This arrangement allows the microprocessor 38 to adjust the transmit signal strength to be within measurement range of the A/D conversion 36, in the manner of an automatic gain control (AGC).

It is to be understood that the processor of the present invention can be a general purpose computer appropriate for its intended function and programmed to undertake appropriate method steps set forth herein. For example, the microprocessor 38 can be included in a desktop computer such as a personal computer or laptop computer made by International Business Machines Corporation (IBM) of Armonk, N.Y. Alternatively, the processor of the present invention may be any computer, including computers sold under trademarks such as AS400, with accompanying IBM Network Stations or, Unix computers, or OS/2 servers, or Windows NT servers, or IBM RS/6000 workstations, or other equivalent devices. Or, the microprocessor 38 can be embodied on an application specific integrated circuit (ASIC) chip, within the base 32.

Figure 3:
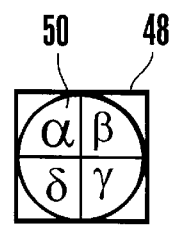
FIG. 3 is a schematic view of a program storage device.

It is to be further understood that the control components such as the correlation module 40 are executed by logic components such as are embodied in logic circuits on, e.g., an ASIC chip, or in software contained in an appropriate electronic data storage, e.g., random access memory (RAM), or hard disk drive and/or optical disk drive, or DASD array, magnetic tape, electronic read-only memory, or other appropriate data storage device that is conventionally coupled to the microprocessor 38 for executing the module 40. For example, the control components can be embodied in a computer diskette 48 shown in FIG. 3. The diskette 48 shown in FIG. 3 has a computer usable medium 50 on which are stored computer readable code means (i.e., program code elements).

The flow charts herein illustrate the structure of the present logic. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown. In other words, the correlation module 40 may be a computer program that is embodied in software or firmware and that is executed by a processor as a series of computer-executable instructions. In an illustrative embodiment of the invention, the computer-executable instructions may be lines of compiled C++ compatible code.

Figure 4:
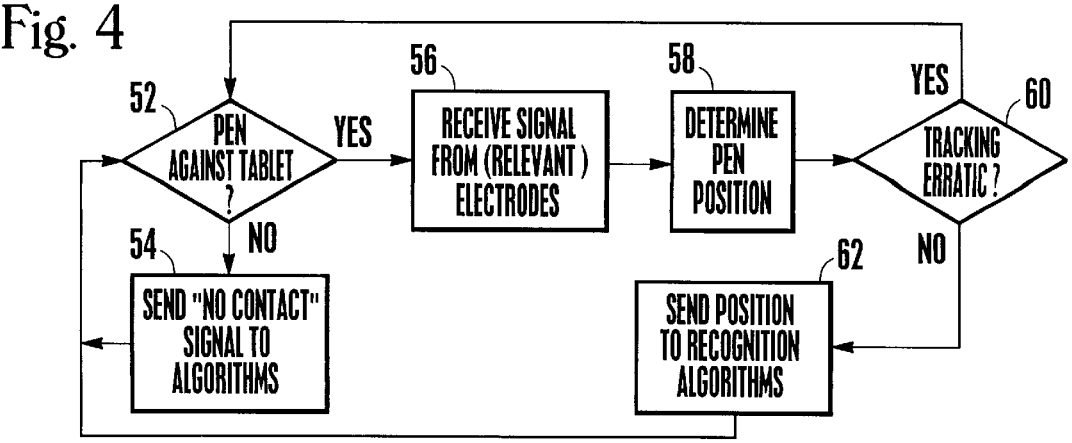
FIG. 4 is a flow chart showing the method steps by which pen position signals are generated based on movement of a pen across the substrate.

FIG. 4 shows the computer-implemented method of the present invention. Commencing at decision diamond 52, it is determined whether the writing instrument 18 has been positioned against the substrate 20. As disclosed further below in reference to FIGS. 5–7, this decision can be undertaken by, e.g., receiving signals from the force sensing layer 21 (FIG. 2) indicating that the person 24 has positioned the instrument 18 against the substrate 20. Or, the microprocessor 38 can determine what the maximum signal strength is from the strongest of the signals received from the receiver electrodes 16. This maximum signal strength can be compared to a predetermined "contact" signal strength that would be expected when a writing instrument contacts the substrate 20, to determine whether in fact the writing instrument contacts the substrate 20. As yet another alternative, the microprocessor 38 can determine when the change of the maximum signal strength from the strongest of the signals received from the receiver electrodes 16, representing the velocity of the pen tip as it approaches the substrate 20, is substantially equal to zero, thus indicating that the writing instrument 18 has been positioned as close to the substrate 20 as possible.

If it is determined at decision diamond 52 that the writing instrument has not been positioned against the substrate 20, the process moves to block 54 to return a "no contact" signal. This signal can be sent to the handwriting recognition engine 30 if desired. The process then loops back to decision diamond 52.

On the other hand, when it is determined that the writing instrument 18 has been positioned against the substrate 20, the process moves to block 56, wherein the signals from the electrodes 16 are received by the microprocessor 38. If desired, only the "n" strongest signals from the electrodes 16 need be received at block 56.

Moving to block 58, a position signal is generated based on the signals from the receiver electrodes 16, with the position signal being representative of the position of the tip 28 of the writing instrument 18 relative to the array 14. In the preferred embodiment, a ratio is determined of the sum of plural signal strengths multiplied by the corresponding electrode coordinates to a sum of plural signal strengths, render the position signal. In other words, the position of the tip 28 is determined as follows:

$x$ position=sum$(S_i*x_i)$/sum$S_i$;

$y$ position=sum $(S_i*y_i)$/sum$S_i$, wherein $S_i$ is the signal strength from the $i^{th}$ receiver electrode 16 that inputs a signal to block 56, and $x_i$ and $y_i$ are the Cartesian coordinates of the $i^{th}$ receiver electrode 16.

Proceeding to decision diamond 60, it is determined whether the movement of the writing instrument 18, i.e., the tracking of the tip 28, is erratic. This can be done by, e.g., ascertaining the difference between the present position of the tip 28 the immediately preceding position, and determining whether the difference exceeds a predetermined difference. If it does, erratic movement of the writing instrument 18 is indicated.

In the event that the microprocessor 38 determines that the writing instrument 18 is moving erratically, an error signal is returned, and the process loops back to decision diamond 52. Otherwise, the process moves to block 62 to send the position signal to the recognition engine 30. Then the process loops back to decision diamond 52.

Figure 5:
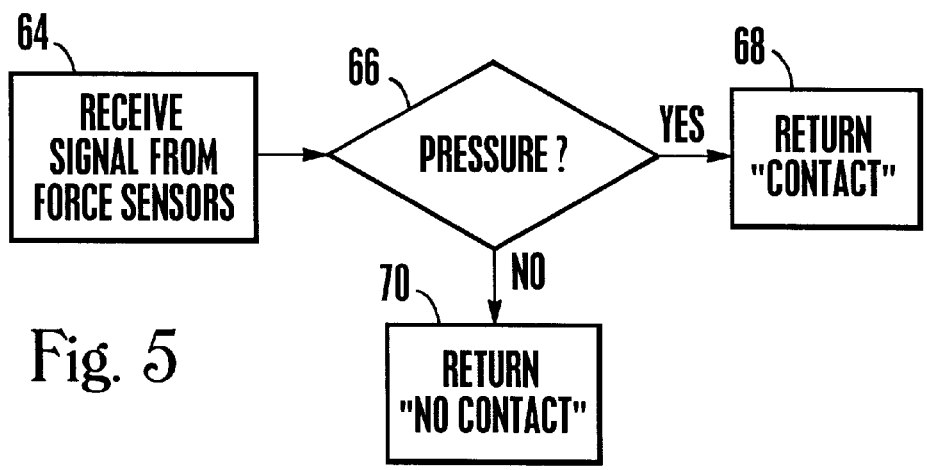
FIG. 5 is a flow chart showing a first method for determining when the writing instrument is positioned against the substrate.
Figure 6:
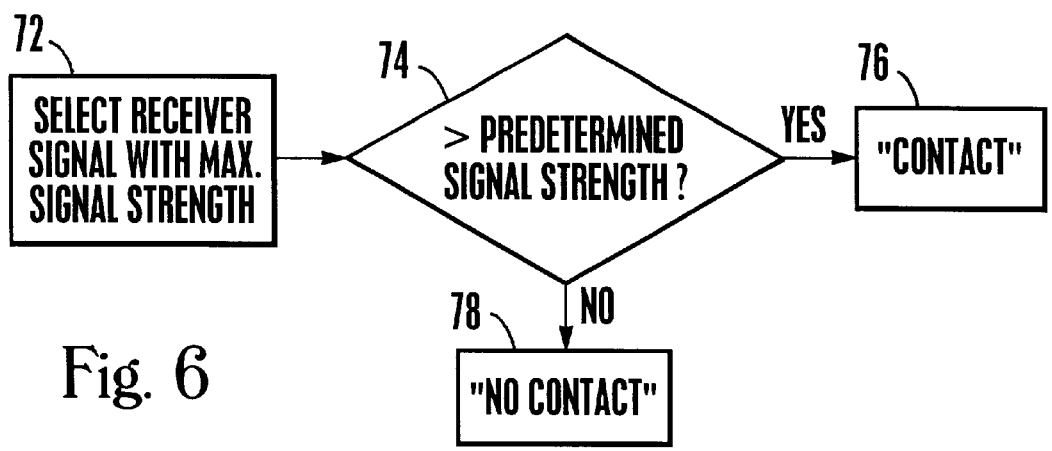
FIG. 6 is a flow chart showing a second method for determining when the writing instrument is positioned against the substrate.
Figure 7:
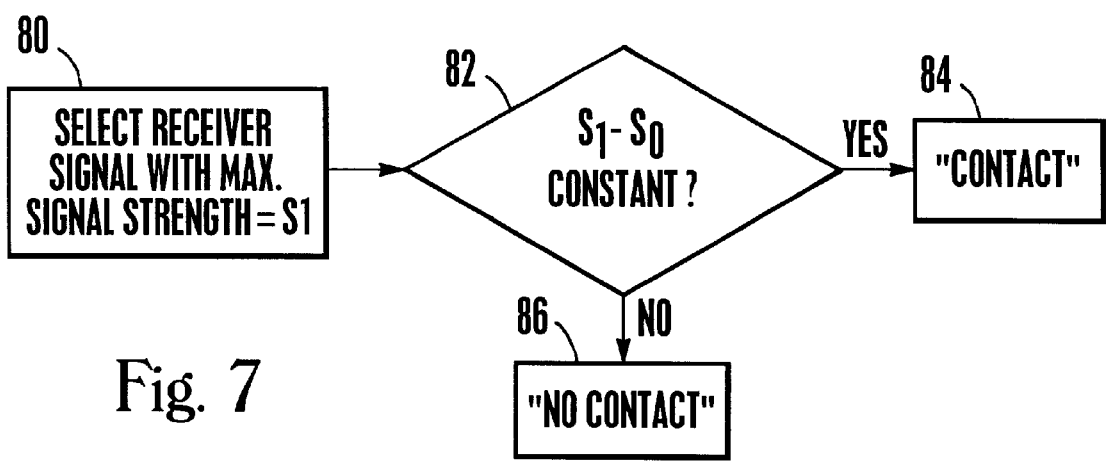
FIG. 7 is a flow chart showing a third method for determining when the writing instrument is positioned against the substrate.

FIGS. 5–7 show methods for determining, at decision diamond 52, whether the writing instrument 18 has been positioned against the substrate 20. At block 64 in FIG. 5 signals from the force sensing layer 21 are received. Moving to decision diamond 66, it is determined whether the signals received at block 64 indicate that pressure has been applied at a point to the force sensing layer 21, indicating that the tip of the writing instrument 18 has been positioned against the substrate 20. If so, the logic moves to block 68 to return a "contact" signal as discussed above, which, it will be recalled, causes the logic of FIG. 4 to move to block 56. Otherwise, the logic of FIG. 5 returns no signal, or otherwise indicates "no contact", causing the logic of FIG. 4 to move to block 54. For completeness, the operation at block 54 in FIG. 4 is also shown at block 70 in FIG. 5.

FIGS. 6 and 7 do not require the incorporation of a force sensing layer 21, but instead determine whether the writing instrument 18 has been positioned against the substrate 20 based on the signals from the array 14. In the particular method shown in FIG. 6, at block 72 the receiver electrode 16 signal that has the highest signal strength is selected. Moving to decision diamond 74, the signal strength selected at block 72 is compared to a predetermined signal strength. If the signal strength selected at block 72 is greater than the predetermined signal strength, the logic moves to block 76 to return a "contact" signal as discussed above, which, it will be recalled, causes the logic of FIG. 4 to move to block 56. Otherwise, the logic of FIG. 6 returns no signal, or otherwise indicates "no contact", causing the logic of FIG. 4 to move to block 54. For completeness, the operation at block 54 in FIG. 4 is also shown at block 78 in FIG. 6.

As yet another alternative, at block 80 in FIG. 7 the receiver electrode 16 signal that has the highest signal strength is selected. This signal strength is designated in FIG. 7 as "$S_1$". It is to be understood that the signal strength selected at block 80 during the preceding sample cycle (or other predetermined previous period) is designated in FIG.

7 as "$S_0$". Moving to decision diamond 82, the difference between the signal strength selected at block 80 (i.e., "$S_1$") and the preceding maximum signal strength (i.e., "$S_0$") is determined. If this difference is zero (or sufficiently close to zero), indicating no change in the maximum signal strength from any electrode, the logic moves to block 84 to return a "contact" signal as discussed above, which, it will be recalled, causes the logic of FIG. 4 to move to block 56. Otherwise, the logic of FIG. 7 returns no signal, or otherwise indicates "no contact", causing the logic of FIG. 4 to move to block 54. For completeness, the operation at block 54 in FIG. 4 is also shown at block 86 in FIG. 7. Thus, in FIG. 7 the time rate of change of the maximum strength is used to determine whether the writing instrument 18 has been positioned against the substrate 20, with no change in the maximum signal strength indicating that the writing instrument 18 is as close as it will get to the substrate 20.

Figure 8:
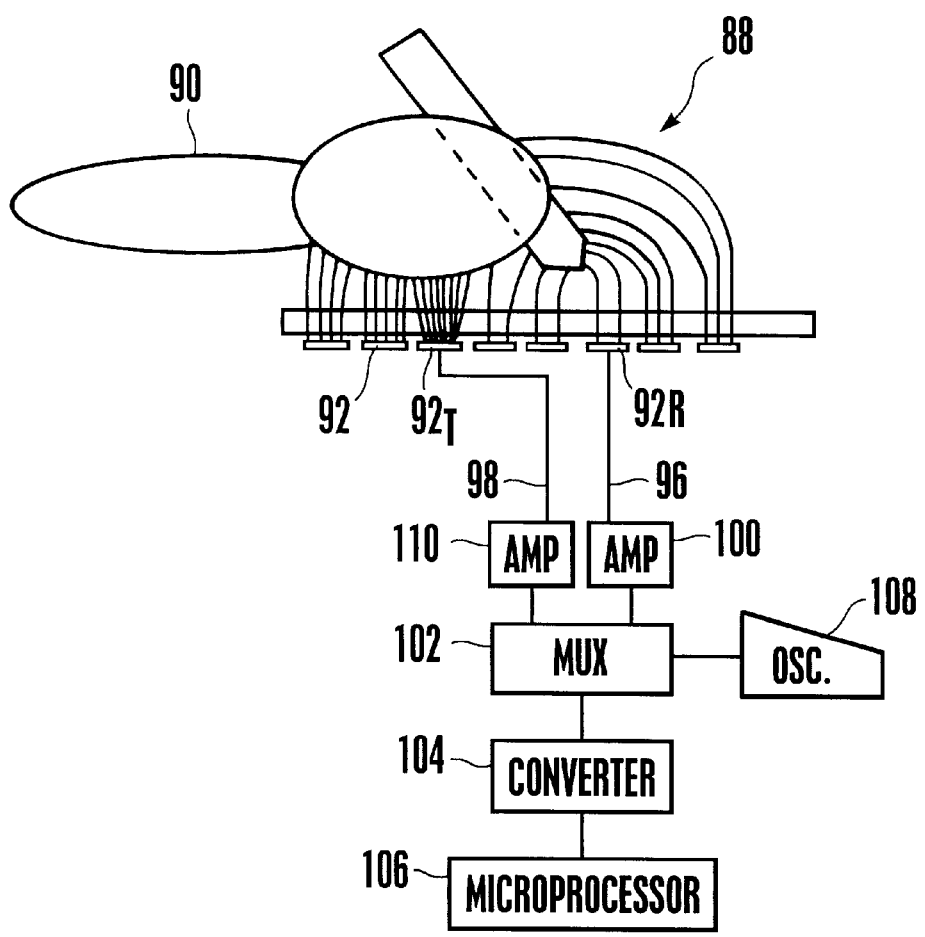
FIG. 8 is a schematic side elevational view of an alternate pen input device in which one or more of the receiver electrodes are multiplexed to function as the transmitter, showing a person's hand writing on a paper substrate and schematically showing electrical components.

FIG. 8 shows a pen input device, generally designated 88, that is in all essential respects identical to the device 10 shown in FIGS. 1 and 2, with the exception that the device 88 shown in FIG. 8 can be used with relatively large pads of paper substrate in which contact between a separate transmitter and a person 90 may not be feasible. Accordingly, in the device shown in FIG. 8, plural electrodes 92 establish an array, with a computer driving one or more of the electrodes to be a transmitting electrode 92T each sample period, to function as a transmitter, and the rest of the electrodes 92 functioning as receive electrodes 92R. It is to be understood that the receive amplifier 100 of the device 88 is electrically connected to each receive electrode 92R, although only receive and transmit connecting lines 96, 98 are shown for clarity of disclosure.

As shown, the receive connecting line 96 is connected to a receive amplifier 100 to amplify signals received from the electrodes 92R. The amplified signals are passed through a multiplexer 102 to a converter 104 for converting analog signals to digital format. The digitized signals are then sent to a microprocessor 106 that functions as described above.

Also, the microprocessor 106 determines which one of the electrodes 92 will function as the transmitter $92_T$, and a transmit signal is converted to analog format by the converter 104 and sent through the multiplexer 102, which cooperates with an oscillator 108 to cause the selected one of the electrodes 92 to assume the function of the transmitter of the present invention. If desired, a transmit amplifier 110 can amplify the transmit signal as shown.

To determine which electrode 92 will be the transmitting electrode $92_T$ in the next sample cycle, the microprocessor 106 can select an electrode 92 that is a predetermined distance from the presently calculated tip position along a predetermined direction. As but one example, the transmitting electrode $92_T$ for the next sample cycle might be the electrode 92 that is five units distance from the present tip position in the Cartesian coordinate system defined by the electrodes 92, measured along a line having a slope of minus one (−1) in the direction of increasing "x" and decreasing "y" from the present tip position. The skilled artisan will recognize that with such a selection, the new transmitter electrode position will be below and to the right of the present tip position, looking down on the electrodes 92. This is about the location of the contact point between the substrate and the hand of a right-handed person who is writing on the substrate with a writing instrument whose tip is at the present tip location.

Furthermore, the skilled artisan will recognize that the device 88 can be "trained" to recognize signals from a hand contacting the substrate, and to refine the selection of the new transmitter electrode accordingly. For example, signals from a hand contact ordinarily will be spread over many more electrodes than will be signals from a tip of a pen. The device 88 can detect such contact and determine a center point of such contact using, e.g., the above-disclosed algorithms, and then determine its distance and direction from the same-cycle tip contact location over one cycle, or an average distance and direction over many cycles can be used. Subsequently, the distance and direction can be used to select the transmitter electrode.

Another approach to selecting the transmitting electrode 92 follows the scheme of "acquire and track". In this approach, each electrode is first tested as a potential transmit electrode 92 in the acquire mode. Once acquired, only electrodes in the vicinity of the transmit electrode 92 are subsequently tested in the track mode. The transmit electrode which produces the largest received signal strength, summed over all receiver electrodes 96, is chosen.

While the particular PEN INPUT DEVICE USING ELECTROSTATIC COUPLING as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited. All structural and functional equivalents to the elements of the above-described preferred embodiment that are known to those of ordinary skill in the art are expressly incorporated herein by reference and are intended to be encompassed by the present claims.

We claim:

1. A pen input device for sensing the position of a tip of a writing instrument regardless of whether the writing instrument includes electrical components, comprising:

an array of electrodes, at least some electrodes being receive electrodes generating a respective received signal characterized by a signal strength, at least one of the electrodes being selectable in a cycle as a transmitting electrode for coupling transmitted signals into a person's hand; and a processor connected at least to the array, whereby a person can use the writing instrument to write on a substrate positioned on the array, the transmitting electrode being selected by the processor such that the transmitted signals are coupled to the person's hand when the person writes on a substrate, the processor receiving at least some of the received signals and determining a position of the tip based at least in part on the signal strengths, the processor discriminating signals from the array generated by hand contact from signals generated by writing instrument contact and selecting a transmitting electrode at least partially based thereon.

2. The device of claim 1, wherein the transmitting electrode is positioned adjacent the array.

3. The device of claim 1, wherein at least one of the receiver electrodes establishes the transmitting electrode.

4. The device of claim 1, further comprising contact logic means associated with the processor for determining when the tip contacts the substrate.

5. The device of claim 1, further comprising position logic means associated with the processor for determining a position of the tip, the position logic means determining a ratio of the sum of plural signal strengths multiplied by one or more corresponding electrode coordinates to a sum of plural signal strengths.

6. The device of claim 1, further comprising a handwriting recognition engine receiving the positions from the processor.

7. In an electrostatic pen input device including a general purpose writing instrument, an array of electrodes and one or more transmitters juxtaposed with the electrodes, a logic device, comprising:

position logic means for determining a position of said writing instrument relative to the array based on signals from the array; and contact logic means for determining when the writing instrument contacts a surface at least partially based on a velocity of the writing instrument relative to the surface.

8. A The logic device of claim 7, wherein the position logic means determines a ratio of the sum of plural signal strengths from the array multiplied by one or more corresponding electrode coordinates to a sum of plural signal strengths.

9. The logic device of claim 7, further comprising a handwriting recognition engine receiving the positions from the position logic means.

10. A device for outputting a signal representative of the position of a general purpose writing instrument on a paper substrate, comprising:

a base positionable under the paper substrate;

plural receivers on the base; and at least one transmitter on the base, the transmitter being arranged on the base such that signals from the transmitter are coupled into a hand of a person when the paper substrate is supported on the base and the person manipulates the general purpose writing instrument to write on the paper substrate, the signals propagating through the general purpose writing instrument for detection of the signals by the receivers when the person manipulates the general purpose writing instrument to write on the paper substrate.

11. The device of claim 10, wherein the receivers establish an array, and the device further comprises a processor connected at least to the array for receiving at least some of the signals and determining a position of a tip of the general purpose writing instrument relative to the array based thereon.

12. The device of claim 11, wherein the transmitter is positioned adjacent the array.

13. The device of claim 11, wherein at least one of the receivers establishes the transmitter.

14. The device of claim 11, further comprising contact logic means associated with the processor for determining when the tip contacts the paper substrate.

15. The device of claim 14, further comprising position logic means associated with the processor for determining a position of the tip, the position logic means determining a ratio of the sum of plural signal strengths of respective signals sensed by the receivers multiplied by one or more corresponding receiver coordinates to a sum of plural signal strengths.

16. The device of claim 10, further comprising a handwriting recognition engine receiving signals generated by the receivers.

17. A method for generating position signals representative of positions of a writing instrument on a substrate, comprising:

providing a writing instrument containing no electrical components;

coupling signals into a hand of a person manipulating the writing instrument against the substrate, the signals propagating through the hand and writing instrument as the writing instrument deposits ink or graphite on the substrate;

receiving signals from the writing instrument, and based thereon;

outputting the position signals.

18. The method of claim 17, further comprising determining when the writing instrument contacts the substrate.

19. The method of claim 17, wherein the signals define signal strengths, and the method further comprises:

providing an array of electrodes, each electrode defining one or more electrode coordinates; and determining a ratio of a sum of plural signal strengths multiplied by one or more corresponding electrode coordinates to a sum of plural signal strengths.

20. The method of claim 17, wherein the coupling and receiving steps are respectively undertaken by one or more transmitters and one or more receivers.

21. The method of claim 17, further comprising correlating the position signals to alpha-numeric characters.

* * * * *